(12) United States Patent
Malet et al.

(10) Patent No.: US 8,231,950 B2
(45) Date of Patent: Jul. 31, 2012

(54) BLOCK COPOLYMER DERIVED FROM RENEWABLE MATERIALS AND METHOD FOR MAKING SUCH BLOCK COPOLYMER

(75) Inventors: Frederic Malet, Rouen (FR); Guillaume Le, Colombelles (FR); Julien Jouanneau, Pont-Audemer (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 13/122,590

(22) PCT Filed: Oct. 6, 2009

(86) PCT No.: PCT/FR2009/051900
§ 371 (c)(1),
(2), (4) Date: Apr. 5, 2011

(87) PCT Pub. No.: WO2010/040944
PCT Pub. Date: Apr. 15, 2010

(65) Prior Publication Data
US 2011/0183099 A1  Jul. 28, 2011

(30) Foreign Application Priority Data
Oct. 6, 2008 (FR) ..................................... 08 56752

(51) Int. Cl.
*B29D 22/00* (2006.01)
*B29D 23/00* (2006.01)
*B32B 1/08* (2006.01)

(52) U.S. Cl. ...... 428/35.7; 428/36.9; 428/408; 525/410; 525/411; 525/420; 525/437; 525/453; 525/50; 442/181; 442/327

(58) Field of Classification Search ................. 428/35.7, 428/36.9, 408; 525/410, 411, 420, 437, 453, 525/50; 442/181, 327
See application file for complete search history.

(56) References Cited

U.S. PATENT DOCUMENTS

| | | |
|---|---|---|
| 2,846,449 A | 8/1958 | Banford et al. |
| 2005/0165210 A1 | 7/2005 | Malet et al. |
| 2008/0023887 A1 | 1/2008 | Vollenberg et al. |
| 2008/0318037 A1 | 12/2008 | Maral et al. |
| 2010/0234539 A1 | 9/2010 | Malet |

FOREIGN PATENT DOCUMENTS

| | | |
|---|---|---|
| GB | 1289571 | 9/1972 |
| WO | WO 8601512 | 8/1986 |

OTHER PUBLICATIONS

Muller, Herbert, "Tetrahydrofuran", Ullmann's Encyclopedia of Industrial Chemistry, Jun. 15, 2000, pp. 1-6 (retrieved from Internet: URL: http://dx.doi.org/10.1002/14356007.a26.

*Primary Examiner* — Michael C Miggins
(74) *Attorney, Agent, or Firm* — Millen, White, Zelano & Branigan, P.C.

(57) ABSTRACT

The present invention relates to a block copolymer derived from at least one tetrahydrofuran monomer containing $^{14}C$. The present invention also relates to a method for preparing such a block copolymer.

37 Claims, No Drawings

BLOCK COPOLYMER DERIVED FROM RENEWABLE MATERIALS AND METHOD FOR MAKING SUCH BLOCK COPOLYMER

FIELD OF THE INVENTION

The present invention relates to thermoplastic elastomers (TPE), and notably engineering polymers of high added value used in various sectors, such as electronics, automobiles or sports. The present invention relates more particularly to a thermoplastic elastomer derived from renewable raw materials. The invention also relates to a method of making said thermoplastic elastomer derived from renewable materials.

In conventional thermoplastic elastomers, we essentially find ingredients of petroleum origin or of synthetic origin. Their methods of production are sometimes regarded as causing environmental pollution.

In fact, the raw materials used for synthesis of these ingredients are obtained by steam cracking or catalytic cracking of petroleum fractions. Use of these materials contributes to the increase in the greenhouse effect. With decreasing world petroleum reserves, the sources of these raw materials are gradually being exhausted.

Raw materials derived from biomass are from a renewable source and have a reduced impact on the environment. They do not require all the energy-consuming refining stages of petroleum products. Production of $CO_2$ is reduced, so that they contribute less to global warming.

It therefore appears necessary to have methods of synthesis that are not dependent on raw materials of fossil origin, but instead use raw materials of renewable origin.

Nowadays, manufacturers who use TPEs are increasingly adopting an eco-design approach and are searching for plastics of high added value of vegetable origin.

Moreover, in competitive markets such as sports or the car industry, manufacturers must meet consumers' demands for polymer materials combining technical and environmental performance. Now, said performance depends both on the raw materials and on the processes used.

The present invention therefore has the aim of providing TPEs that meet these requirements, both in terms of mechanical properties, chemical resistance or resistance to aging, and in terms of ecology and biology.

PRIOR ART

Thermoplastic elastomer (TPE) means a block copolymer comprising alternating blocks or segments that are called hard or rigid (rather with thermoplastic behavior) and blocks or segments that are pliable or flexible (rather with elastomeric behavior). The flexible blocks are generally based on polyethers (PE) selected from poly(ethylene glycol) (PEG), poly(1,2-propylene glycol) (PPG), poly(1,3-propylene glycol) (PO3G), poly(tetramethylene glycol) (PTMG), and copolymers or blends thereof. The rigid blocks are generally based on polyamide, polyurethane, polyester or a mixture of these polymers.

As examples of copolymers with rigid blocks and with flexible blocks, we may mention respectively (a) copolymers with polyester blocks and polyether blocks (also called COPE or copolyetheresters), (b) copolymers with polyurethane blocks and polyether blocks (also called TPU, abbreviation of thermoplastic polyurethanes) and (c) copolymers with polyamide blocks and polyether blocks (also called PEBA according to IUPAC).

In the field of thermoplastic elastomers such as TPU or COPE, products manufactured partially from raw materials of renewable origin have recently been marketed. As an example, the TPUs marketed under the brand name Pearlthane® ECO-D12T95 by Merquinsa claim a proportion of renewable carbon of 38% according to ASTM-D6866. We may also mention the COPE range marketed under the brand name Hytrel® RS by Dupont. This COPE comprises a PO3G derived from renewable resources that replaces petrochemical polyols.

As for the PEBAs, they are mainly obtained from raw materials of fossil origin, as only these make it possible to achieve the cost/performance compromise required for certain applications.

In fact, the PEBAs or Polyether-Block-Amides, such as those marketed by the company Arkema under the name Pebax®, are plasticizer-free thermoplastic elastomers which belong to the class of engineering polymers. They can be processed easily by injection molding and extrusion of shapes or films. They can also be used in the form of filaments, threads and fibers for woven fabrics and nonwovens. They are used in applications of high added value and in particular:

high-level sport, notably as elements of soles of footwear for sprinting, football, rugby, tennis, basket-ball, running, Alpine or Nordic skiing, as well as in golf balls, and in many other sports articles;

in industry, notably as conveyor belts, as breathable rainwear or as antistatic additive;

in the medical field, notably as catheters, angioplasty balloons, peristaltic band;

automobile, notably as synthetic leather, skin panels, instrument panels, airbag components, etc.

They make it possible to combine, in a single polymer, unequalled mechanical properties and very good resistance to thermal or UV aging, as well as low density. They thus make it possible to produce lightweight components. In particular, at equivalent hardness, they dissipate less energy than other materials, which endows them with very good resistance to dynamic stresses in bending or tension, and they have exceptional properties of elastic springback.

Since 2007, the "Pebax® Rnew" range marketed by Arkema is the only one to offer a range of engineering-grade thermoplastic elastomers in which the proportion of carbon of renewable origin varies from about 20% to 95%, depending on the content of polyamide of renewable origin in the thermoplastic elastomer. In fact the classical PEBA is a thermoplastic elastomer obtained from polyamide 12 (or from polyamide 6) for the rigid block and from PTMG for the flexible block, these two blocks being made from materials of fossil origin.

For the rigid block, a first move towards developing renewable raw materials consisted of selecting a polyamide made from raw materials of vegetable origin, such as amino-11-undecanoic acid. In fact, amino-11-undecanoic acid is obtained from the processing of castor oil, extracted from the plant of the same name (*Ricinus communis*, the castor-oil plant), from the seeds of the castor-oil plant. Replacement of PA 12 with PA 11, obtained by polycondensation of amino-11-undecanoic acid, in the manufacture of PEBA provides, in addition to a reduced environmental impact, a material for which certain properties are superior to those of the material of fossil origin. In particular, the PEBAs manufactured on the basis of PA 11 no longer have a plasticity threshold when submitted to stress, giving an improvement not only in low-temperature impact strength, but also in bending fatigue strength. The heat resistance is also improved, along with increased stiffness at low temperature.

However, for the polyether flexible block there is at present no renewable alternative to PTMG, other than the PO3G polyethers recently put on the market by Dupont under the brand name Cerenol®, or the flexible polyesters, based on dimerized fatty acid, marketed by Unigema under the brand name Priplast®. However, use of said PO3G polyether blocks alone or Priplast® polyesters alone for making PEBAs does not allow the same performance to be achieved as with PTMG blocks, in terms of density, take-up of water and/or mechanical properties.

The present invention therefore has the aim of devising a novel TPE that is of renewable origin and offers high performance. The present invention notably has the aim of supplying a TPE of renewable origin, but with performance at least equivalent to that of the conventional TPE of fossil origin.

The present invention also has the aim of supplying a method of manufacture of said TPE that is simple, easy to apply, rapid (with the fewest possible stages), and that does not involve chemical or technological manipulations that are arduous, energy-consuming or polluting, so as to have the smallest possible environmental impact.

Armed with its expertise in the manufacture of high-performance bioresourced polymers, the applicant was now able to demonstrate that it is possible to produce a TPE:
- in which the polyether flexible blocks are of renewable origin, owing to the use of tetrahydrofuran containing $^{14}C$, notably owing to the use of PTMG blocks made from biomass, and
- whose performance is at least identical to that of the corresponding TPEs whose polyether blocks are of fossil origin.

SUMMARY OF THE INVENTION

The invention relates to a block copolymer derived from at least one tetrahydrofuran monomer containing $^{14}C$. Advantageously, said copolymer comprises at least one polyether block derived at least partially from tetrahydrofuran containing $^{14}C$.

Advantageously, the block copolymer according to the invention comprises:
- from 1 to 99% of at least one polyether flexible block derived at least partially from tetrahydrofuran containing $^{14}C$, and
- from 1 to 99% of at least one rigid block selected from: polyamide blocks, polyurethane blocks, polyester blocks, and mixtures thereof.

Advantageously, said at least one polyether flexible block comprises at least one polytetramethylene glycol (PTMG) derived at least partially from renewable materials.

Advantageously, the proportion by mass of said at least one flexible block represents from 5 to 95%, preferably from 5 to 85%, and the proportion by mass of said at least one rigid block represents from 5 to 95%, preferably from 15 to 95% of the total mass of the copolymer.

Advantageously, said at least one rigid block is derived at least partially from renewable raw materials.

Advantageously, said at least one polyether block and/or said at least one rigid block is/are derived totally from renewable materials.

Advantageously, the copolymer according to the invention has a biocarbon content of at least 1%, which corresponds to a $^{14}C/^{12}C$ isotope ratio of at least $1.2\times10^{-14}$.

Advantageously, the copolymer according to the invention has a biocarbon content above 5%, preferably above 10%, preferably above 25%, preferably above 50%, preferably above 75%, preferably above 90%, preferably above 95%, preferably above 98%, preferably above 99%, advantageously roughly equal to 100%, which corresponds to a $^{14}C/^{12}C$ isotope ratio of $1.2\times10^{-12}$.

Advantageously, the copolymer according to the invention comprises at least one polyamide block. Advantageously, said polyamide comprises a copolymer. Advantageously, the copolymer according to the invention comprises at least one polyamide block comprising at least one of the following molecules: amino-11-undecanoic acid, n-heptylamino-11-undecanoic acid, succinic acid, azelaic acid, sebacic acid, dodecanedioic acid, myristic acid, tetradecanedioic acid, hexadecanedioic acid, octadecanedioic acid, butanediamine, pentanediamine, decamethylenediamine, fatty diacid(s), fatty acid dimer(s) and mixtures thereof. Advantageously, said at least one polyamide block comprises at least one monomer selected from the following polyamide monomers: 11, 5.4, 5.9, 5.10, 5.12, 5.13, 5.14, 5.16, 5.18, 5.36, 6.4, 6.9, 6.10, 6.12, 6.13, 6.14, 6.16, 6.18, 6.36, 10.4, 10.9, 10.10, 10.12, 10.13, 10.14, 10.16, 10.18, 10.36, 10.T, 12.4, 12.9, 12.10, 12.12, 12.13, 12.14, 12.16, 12.18, 12.36, 12.T and blends or copolymers thereof. Advantageously, the block copolymer according to the invention is a PEBA.

Advantageously, said PEBA is based on PA11-PTMG, PA10.10-PTMG, PA10.12-PTMG, PA10.14-PTMG, PA6.10-PTMG, PA6.12-PTMG, and/or PA6.18-PTMG, preferably based on PA11-PTMG.

Advantageously, the copolymer according to the invention comprises at least one polyester block. Advantageously, said polyester comprises a copolymer.

Advantageously, said at least one polyester block comprises at least one of the following molecules: ethylene glycol, 1,3-propanediol, 1,4-butanediol, 1,10-decanediol, dimerized fatty acid reduced to obtain the corresponding diol, 2,5-furandicarboxylic acid, succinic acid, azelaic acid, sebacic acid, dodecanedioic acid, myristic acid, tetradecanedioic acid, hexadecanedioic acid, octadecanedioic acid, and/or dimerized fatty acids.

Advantageously, said copolymer according to the invention is a polyetherester.

Advantageously, the copolymer according to the invention comprises at least one polyurethane block. Advantageously, said polyurethane comprises a copolymer. Advantageously, said at least one polyurethane block is made from at least one polyol of renewable origin, selected from the following polyols: polyols derived from starch; erythritol; sorbitol; maltitol; mannitol; polyols derived from sugars, sucrose; isomalt; xylitol; polyols derived from maize, soya, cotton, colza, sunflower or peanut; glycerol; propylene glycol; ethylene glycol; reaction coproducts from biodiesel production; polyethylene glycol (PEG), poly(1,2-propylene glycol) (PPG), poly(1,3-propylene glycol) (PO3G), polytetramethylene glycol (PTMG).

Advantageously, said copolymer according to the invention is a polyetherurethane.

Advantageously, said at least one polyether block additionally comprises polyethers other than PTMG, such as PEG, PPG, PO3G, poly(3-methyltetrahydrofuran) of renewable origin or of fossil origin and/or PTMG of fossil origin.

Advantageously, the copolymer according to the invention is a segmented block copolymer comprising three different types of blocks (called triblock hereinafter), said triblock being selected from copolyetheresteramides, copolyetheramideurethanes, copolyetheresterurethanes, in which:
- the percentage by mass of polyether flexible block is above 20%;
- the percentage by mass of polyamide rigid block is above 10%;

of the total mass of triblock.

The present invention also relates to a method for preparing block copolymer as defined previously, comprising the stage of supplying polyether derived at least partially from tetrahydrofuran containing $^{14}C$ and conversion by synthesis to block copolymer.

Advantageously, said polyether comprises polytetramethylene glycol having a biocarbon content of at least 1%.

Advantageously, the copolymer according to the invention comprises a stage of production of polyether from tetrahydrofuran having a biocarbon content of at least 1%.

Advantageously, the supply stage comprises a stage of production of said tetrahydrofuran from furfural.

Advantageously, the supply stage comprises a stage of production of said furfural from plant biomass. Advantageously, said furfural is produced by hydrolysis of pentosans.

The present invention also relates to the use of the block copolymer as defined previously, in the automobile industry, textiles, woven fabrics, nonwovens, clothing, shoes, sports articles, leisure articles, electronics, computer equipment, health equipment, industrial additives, packaging and/or household products.

Advantageously, the block copolymer according to the invention is used in instrument panels, airbags, soles of sports shoes, golf balls, tubes for medical use, catheters, angioplasty balloons, peristaltic bands, conveyor belts, breathable rainwear, antistatic additives, skin panels, and/or synthetic leather.

Advantageously, the block copolymer of the invention is used alone or mixed, said copolymer representing by mass from 5 to 100%, preferably from 5 to 70%, preferably from 5 to 30%.

DETAILED DESCRIPTION OF THE INVENTION

The invention uses products of natural origin as starting products for making thermoplastic elastomers.

The carbon of a biomaterial comes from the photosynthesis of plants and therefore from atmospheric $CO_2$. The degradation (degradation will also be used with the meaning of combustion/incineration at the end of life) of these materials to $CO_2$ therefore does not contribute to global warming since there is no increase in carbon discharged into the atmosphere. The $CO_2$ balance of biomaterials is therefore much better and contributes to a reduction of the carbon footprint of the products obtained (only the energy for manufacture has to be taken into account). In contrast, when a material of fossil origin also degrades to $CO_2$ it will contribute to the increase in the proportion of $CO_2$ and therefore to global warming.

The compounds according to the invention will therefore have a better carbon footprint than that of compounds obtained from a fossil source.

The invention therefore also improves the ecological balance during manufacture of TPEs.

The term "biocarbon" indicates that the carbon is of renewable origin, or of natural origin and is from a biomaterial, as indicated below. The biocarbon content and the content of biomaterial are expressions denoting the same value.

A material of renewable origin, also called biomaterial, is an organic material in which the carbon comes from $CO_2$ fixed recently (on the human scale) by photosynthesis from the atmosphere. On land, this $CO_2$ is captured or fixed by plants. In the sea, the $CO_2$ is captured or fixed by bacteria or by plankton carrying out photosynthesis. A biomaterial (100% carbon of natural origin) has a $^{14}C/^{12}C$ isotope ratio greater than $10^{-12}$, typically of the order of $1.2 \times 10^{-12}$, whereas a fossil material has a ratio of zero. In fact, the $^{14}C$ isotope forms in the atmosphere and is then integrated by photosynthesis, on a time scale of some decades at most. The half-life of $^{14}C$ is 5730 years. Therefore materials derived from photosynthesis, namely plants in general, necessarily have a maximum content of isotope $^{14}C$.

The content of biomaterial or of biocarbon is determined on the basis of standards ASTM D 6866 (ASTM D 6866-06) and ASTM D 7026 (ASTM D 7026-04). Standard ASTM D 6866 relates to "Determining the Biobased Content of Natural Range Materials Using Radiocarbon and Isotope Ratio Mass Spectrometry Analysis", whereas standard ASTM D 7026 relates to "Sampling and Reporting of Results for Determination of Biobased Content of Materials via Carbon Isotope Analysis". The second standard refers in its first paragraph to the first standard.

The first standard describes a test for measuring the $^{14}C/^{12}C$ ratio of a sample and compares it with the $^{14}C/^{12}C$ ratio of a reference sample of 100% renewable origin, to give a relative percentage of C of renewable origin in the sample. The standard is based on the same concepts as $^{14}C$ dating, but without applying dating equations.

The ratio thus calculated is designated as "pMC" (percent Modern Carbon). If the material to be analyzed is a mixture of biomaterial and fossil material (without radioactive isotope), then the value of pMC obtained is directly correlated with the amount of biomaterial present in the sample. The reference value used for dating with $^{14}C$ is a value dating from the 1950s. This year was chosen because there were nuclear tests in the atmosphere, which introduced large amounts of isotopes into the atmosphere after this date. The reference 1950 corresponds to a pMC value of 100. Taking into account the thermonuclear tests, the present value to be adopted is about 107.5 (which corresponds to a correction factor of 0.93). The radioactive carbon signature of a plant today is therefore 107.5. A signature of 54 pMC and one of 99 pMC therefore correspond to an amount of biomaterial in the sample of 50% and 93%, respectively.

The standard ASTM D 6866 proposes three methods of measuring the content of isotope $^{14}C$:

LSC (Liquid Scintillation Counting) liquid scintillation spectrometry. This technique consists of counting Beta particles resulting from the disintegration of $^{14}C$. The Beta radiation from a sample of known mass (known number of C atoms) is measured over a certain time. This "radioactivity" is proportional to the number of $^{14}C$ atoms, which can thus be determined. The $^{14}C$ present in the sample emits β rays, which on contact with the scintillation fluid (scintillator) give rise to photons. These photons have different energies (between 0 and 156 keV) and form what is called a $^{14}C$ spectrum. According to two variants of this method, the analysis relates either to the $CO_2$ previously produced by the carbon-containing sample in a suitable absorbent solution, or to benzene after prior conversion of the carbon-containing sample to benzene. Standard ASTM D 6866 therefore gives two methods A and C, based on this LSC method.

AMS/IRMS (Accelerated Mass Spectrometry coupled with Isotope Radio Mass Spectrometry). This technique is based on mass spectrometry. The sample is reduced to graphite or to gaseous $CO_2$, analyzed in a mass spectrometer. This technique uses an accelerator and a mass spectrometer to separate the $^{14}C$ from the $^{12}C$ ions and thus determine the ratio of the two isotopes.

The compounds according to the invention come at least partly from biomaterial and therefore have a content of biomaterial of at least 1%, which corresponds to a content of $^{14}C$ of at least $1.2 \times 10^{-14}$. This content is advantageously higher, notably up to 100%, which corresponds to a content of $^{14}C$ of $1.2\times10^{-12}$. The compounds according to the invention can therefore comprise 100% of biocarbon or in contrast result from a mixture with a fossil origin.

The compounds according to the invention are, as mentioned above, thermoplastic elastomers (TPE) derived at least partially from raw materials of renewable origin.

More precisely, the present invention relates to thermoplastic elastomers (TPE), block copolymers, comprising at least one polyether block derived from at least one tetrahydrofuran monomer (THF) containing $^{14}C$.

As examples of polyethers that can be made from THF containing $^{14}C$, we may mention polytetramethylene glycol (PTMG), also called polytetrahydrofuran; poly(3-alkyl tetrahydrofuran) and in particular poly(3-methyltetrahydrofuran (poly(3MeTHF)). Thus, these polyethers are obtained at least partially from raw materials of renewable origin.

Polyether blocks (hereinafter abbreviated to PE) mean, in the sense of the invention, polyalkylene ether polyols, notably polyalkylene ether diols. Preferably, said at least one PE block of the copolymer of the invention comprises at least poly(tetramethylene glycol) (PTMG) of at least partially renewable origin. The PE blocks of the copolymer of the invention can additionally comprise other PEs of renewable origin or of fossil origin, selected from poly(ethylene glycol) (PEG), poly (1,2-propylene glycol) (PPG), polytetramethylene ether glycol (PTMG) of nonrenewable origin, polyhexamethylene glycol, poly(1,3-propylene glycol) (PO3G), poly (3-alkyl tetrahydrofuran) in particular poly(3-methyltetrahydrofuran (poly(3MeTHF)), and mixtures thereof. A PE block of the block or random "copolyether" type containing a chain of at least two types of PE mentioned above can also be envisaged.

The polyether blocks can also comprise blocks obtained by ethoxylation of bisphenols, for example bisphenol A. These last-mentioned products are described in patent EP 613 919.

The polyether blocks can also comprise ethoxylated primary amines. Advantageously these blocks are also used. As examples of ethoxylated primary amines we may mention the products of formula:

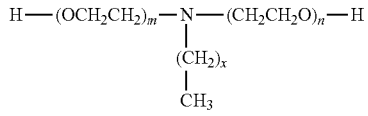

in which m and n are between 1 and 20 and x is between 8 and 18. These products are available commercially under the brand name NORAMOX® from the company CECA and under the brand name GENAMIN® from the company CLARIANT.

Thus, the chain ends of the PE blocks can be diOH, diNH2, diisocyanate or diacid depending on their method of synthesis.

The PE blocks with NH2 chain ends can be obtained by cyanoacetylation of aliphatic dihydroxylated alpha-omega polyoxyalkylene sequences called polyether dials such as Jeffamines® D300, D400, D2000, ED-600, ED-900, ED2003, the Elastamines® RP-409, RP-2009, RT-1000, RE-600, RE-900, RE-2000, HT-1700, HE-180 from the company Huntsman. Said blocks are described in patents JP 2004346274, JP 2004352794 and EP1482011.

Polytetramethylene glycol, also called α-hydro-ω-hydroxypoly(oxy-1,4-butanediyl) or polyoxytetramethylene glycol, can also be abbreviated to PTMG or PTHF or PIMEG or PO4G; the abbreviation PTMG is used in the present description. Thus, the polyether blocks of the TPEs according to the invention comprise at least one unit —O—$(CH_2)_4$—, in which the carbons are biocarbons.

Advantageously, said at least one polyether derived from at least one THF monomer containing $^{14}C$, for example PTMG, is synthesized from tetrahyfrofuran which is itself synthesized from furfural (also called 2-furaldehyde or furfuraldehyde) which is the derivative of various agricultural byproducts such as maize, oat bran and wheat bran, and sawdust.

The thermoplastic elastomers (TPE) according to the invention can additionally contain other flexible blocks that are not polyether-based. We may notably mention blocks based on polyesters such as poly(caprolactone) or polyesters of the Priplast® type, based on polydimethylsiloxane or PDMS, based on aliphatic polycarbonate, based on polyolefin such as polybutadiene, polyisobutylene etc.

Moreover, the thermoplastic elastomers (TPE) according to the invention comprise at least one rigid block selected from polyamide blocks, polyurethane blocks, polyester blocks, and mixtures thereof in the form of block or random copolymers.

The rigid blocks can be derived from renewable materials and/or from materials of fossil origin. Advantageously, said rigid blocks are also derived at least partially from renewable materials. According to a particularly advantageous embodiment of the present invention, the polyether blocks and/or the polyamide blocks and/or the polyurethane blocks and/or the polyester blocks are derived totally from renewable materials.

Thus, depending on the choice of components of the flexible and rigid blocks, the biocarbon content of the copolymer of the invention is at least 1%, which corresponds to a $^{14}C/^{12}C$ isotope ratio of at least $1.2\times10^{-14}$. The biocarbon content of the copolymer of the invention is preferably above 5%, preferably above 10%, preferably above 25%, preferably above 50%, preferably above 75%, preferably above 90%, preferably above 95%, preferably above 98%, preferably above 99%. It is advantageously roughly equal to 100%, which corresponds to a $^{14}C/^{12}C$ isotope ratio of at least $1.2\times10^{-12}$.

According to a preferred embodiment, the block copolymer of the present invention comprises at least one polyether flexible block derived at least partially from THF containing $^{14}C$, preferably at least one polytetramethylene glycol obtained at least in part from raw materials of renewable origin and polyamide blocks.

Polyamide means, in the sense of the invention, homopolyamides and copolyamides; i.e. products of condensation of lactams, amino acids or diacids with diamines and, as a general rule, any polymer formed by units joined together by amide groups.

Polyamide of totally renewable origin that can be included in the copolymer according to the invention means:
  aliphatic polyamides obtained from lactams or from amino acids (for example PA 11 obtained by polycondensation of amino-11-undecanoic acid);
  the products of condensation of a dicarboxylic acid with a diamine (for example PA 10.10, the condensation product of decanediamine with sebacic acid, or PA 10.12, the condensation product of decanediamine with dodecanedioic acid, or PA 10.36, the condensation product of decanediamine with a fatty acid dimer);
  the copolyamides resulting from the polymerization of various monomers, such as those mentioned above, for example the following copolyamides: PA 11/10.10, PA 11/10.12, PA 10.10/10.12, PA 11/10.36, PA 10.12/10.36, PA 10.10/10.36, the amino-11-undecanoic/n-heptyl-11-aminoundecanoic copolyamide, etc. Copolyamides of renewable origin, which comprise at least two monomers, are more particularly described in French patent application No.: 07.53319.

The term "monomer" in the present description of copolyamides must be understood in the sense of "repeating unit". In fact, a particular case is when a repeating unit of PA is constituted of a combination of a diacid with a diamine. It is considered that it is the combination of a diamine and of a diacid, i.e. the diamine.diacid couple (in equimolar amount), that corresponds to the monomer. This is explained by the fact that individually, the diacid or the diamine is only one structural unit, which in itself is not sufficient to polymerize.

As examples of amino acids of renewable origin, we may mention: 11-aminoundecanoic acid produced for example from castor oil, 10-aminodecanoic acid produced for example from decylenic acid obtained by metathesis of oleic acid, 9-aminononanoic acid produced for example from oleic acid.

As examples of diacids of renewable origin, we may mention, according to the number x of carbons in the molecule (Cx):

C4: succinic acid from glucose for example;
C6: adipic acid from glucose for example;
C7: heptanedioic acid from castor oil;
C9: azelaic acid from oleic acid (ozonolysis) for example;
C10: sebacic acid from castor oil for example;
C11: undecanedioic acid from castor oil;
C12: dodecanedioic acid from biofermentation of dodecanoic acid=lauric acid (rich oil: cabbage palm oil and coconut oil) for example;
C13: brassylic acid from erucic acid (ozonolysis) which occurs in colza for example;
C14: tetradecanedioic acid by biofermentation of myristic acid (rich oil: cabbage palm oil and coconut oil) for example;
C16: hexadecanedioic acid by biofermentation of palmitic acid (mainly palm oil) for example;
C18: octadecanedioic acid obtained by biofermentation of stearic acid (a little in all vegetable oils but chiefly in animal fats) for example;
C20: eicosanedioic acid obtained by biofermentation arachidic acid (mainly in colza oil) for example;
C22: docosanedioic acid obtained by metathesis of undecylenic acid (castor oil) for example;
C36: fatty acid dimer derived principally from oleic and linoleic acids.

As examples of diamines of renewable origin, we may mention, according to the number x of carbons in the molecule (Cx):

C4: butanediamine obtained by amination of succinic acid, by biofermentation;
C5: pentamethylene diamine (from lysine);
and so on for the diamines obtained by amination of the diacids of renewable origin already discussed.

"Polyamide of partially renewable origin", i.e. derived only partly from renewable materials (called "mixed" polyamide in this document) means:

the products of condensation of a dicarboxylic acid with a diamine, and in which only one of the two (the diacid or the diamine) is of renewable origin. This applies for example to PA 6.10, since in the monomer 6.10, only the sebacic acid is of renewable origin, whereas the hexamethylene diamine is obtained from petrochemistry.

the copolyamides resulting from the polymerization of various monomers (renewable, nonrenewable or mixed) such as those mentioned above. This applies for example to CoPA 6.6/10.10 in which the monomer "6.6" is of nonrenewable origin whereas the monomer "10.10" is of renewable origin. This also applies to PA 11/10.T for example, which comprises a monomer of renewable origin ("11") and a mixed monomer of partially renewable origin ("10.T") since only the decanediamine is of renewable origin, whereas the terephthalic acid (T) is not.

"Polyamide of fossil origin" means all the other polyamides on the Earth that are not included in the two categories mentioned above, i.e. that are not made from renewable organic raw materials.

Advantageously, the block copolymer of the present invention forms a polyether block amide, abbreviated to PEBA.

The PEBAs according to the invention therefore include any TPE comprising at least one polyether block, the latter being derived at least partially from THF containing $^{14}$C, such as polytetramethylene glycol or PTMG derived at least partially from renewable materials, and at least one PA block (homopolyamide or copolyamide) derived from fossil materials or else derived totally or partially (in the case of mixed polyamides) from renewable raw materials.

The PEBAs result from the polycondensation of polyamide blocks with reactive ends with polyether blocks with reactive ends, such as, among others:

1) polyamide blocks with diamine chain ends with polyoxyalkylene blocks with dicarboxylic chain ends.
2) polyamide blocks with dicarboxylic chain ends with polyoxyalkylene blocks with diamine chain ends, obtained by cyanoethylation and hydrogenation of aliphatic dihydroxylated alpha-omega polyoxyalkylene blocks called polyetherdiols
3) polyamide blocks with dicarboxylic chain ends with polyetherdiols, the products obtained being, in this particular case, polyetheresteramides.

The polyamide blocks with dicarboxylic chain ends result, for example, from the condensation of precursors of polyamides in the presence of a chain-limiting dicarboxylic acid.

The polyamide blocks with diamine chain ends are obtained for example from the condensation of precursors of polyamides in the presence of a chain-limiting diamine. The number-average molecular weight Mn of the polyamide blocks is in the range from 400 to 20 000 g/mol, preferably from 500 to 10 000 g/mol, and more preferably from 600 to 6000 g/mol.

The polymers with polyamide blocks and polyether blocks can also comprise randomly distributed units.

The polyamide blocks can comprise homopolyamides or copolyamides.

Three types of polyamides can be present in the composition of these PA blocks.

According to a first type, the polyamide blocks are derived from the condensation of at least one dicarboxylic acid (aliphatic, cycloaliphatic or aromatic) in particular those having from 4 to 36 carbon atoms, preferably those having from 6 to 18 carbon atoms and from at least one diamine (aliphatic, cycloaliphatic or aromatic) selected in particular from those having from 2 to 20 carbon atoms, preferably those having from 6 to 15 carbon atoms.

As examples of aliphatic diacids, we may mention butanedioic, adipic, suberic, azelaic, sebacic, dodecanedicarboxylic, myristic, tetradecanedicarboxylic, hexadecanedicarboxylic, octadecanedicarboxylic acids and the dimerized fatty acids.

As examples of cycloaliphatic diacids, we may mention 1,4-cyclohexyldicarboxylic acid.

As examples of aromatic diacids, we may mention terephthalic acid (T) and isophthalic acid (I).

As examples of aliphatic diamines, we may mention tetramethylenediamine, hexamethylenediamine, 1,10-decamethylenediamine, dodecamethylenediamine, trimethylhexamethylenediamine.

As examples of cycloaliphatic diamines, we may mention the isomers of bis-(4-aminocyclohexyl)-methane (BACM or PACM), bis-(3-methyl-4-aminocyclohexyl)-methane (BMACM or MACM), and 2-2-bis-(3-methyl-4-aminocyclohexyl)-propane (BMACP), isophororiediamine (IPDA), 2,6-bis-(aminomethyl)-norbornane (BAMN) and piperazine (Pip).

Advantageously, the copolymer according to the invention comprises at least one PA block based on PA 4.4, PA 4.6, PA 4.9, PA 4.10, PA 4.12, PA 4.14, PA 4.16, PA 4.18, PA 4.36, PA 6.4, PA 6.6, PA 6.9, PA 6.10, PA 6.12, PA 6.13, PA 6.14, PA 6.16, PA 6.18, PA 6.36, PA 9.4, PA 9.6, PA 9.10, PA 9.12, PA 9.14, PA 9.18, PA 9.36, PA 10.4, PA 10.6, PA 10.9, PA 10.10, PA 10.12, PA 10.13, PA 10.14, PA 10.16, PA 10.18, PA 10.36, PA 10.T, PA BMACM.4, PA BMACM.6, PA BMACM.9, PA BMACM.10, PA BMACM.12, PA BMACM.14, PA BMACM.16, PA BMACM.18, PA BMACM.36, PA PACM.4, PA PACM.6, PA PACM.9, PA PACM.10, PA PACM.12, PA PACM.14, PA PACM.16, PA PACM.18, PA PACM.36, PA Pip.4, PA Pip.6, PA Pip.9, PA Pip.10, PA Pip.12, PA Pip.14, PA Pip.16, PA Pip.18 and/or PA Pip.36, and mixtures thereof.

According to a second type, polyamide blocks result from the condensation of one or more alpha-omega aminocarboxylic acids and/or one or more lactams having from 6 to 12 carbon atoms in the presence of a dicarboxylic acid having from 4 to 12 carbon atoms or of a diamine.

As examples of lactams, we may mention caprolactam, enantholactam and lauryllactam.

As examples of alpha-omega aminocarboxylic acid, we may mention the aminocaproic, amino-7-heptanoic, amino-11-undecanoic and amino-12-dodecanoic acids.

Advantageously, the polyamide blocks of the second type are of polyamide 11, of polyamide 12 or of polyamide 6.

According to a third type, the polyamide blocks result from the condensation of at least one monomer of the first type with at least one monomer of the second type. In other words, the polyamide blocks result from the condensation of at least one alpha-omega aminocarboxylic acid (or a lactam), with at least one diamine and a dicarboxylic acid.

In this case, the PA blocks are prepared by polycondensation:
of aliphatic, cycloaliphatic or aromatic diamine(s) having X carbon atoms;
of dicarboxylic acid(s) having Y carbon atoms; and
of comonomer(s) {Z}, selected from lactams and alpha-omega aminocarboxylic acids having Z carbon atoms;
in the presence of a chain limiter selected from dicarboxylic acids or diamines or an excess of diacid or of diamine used as structural unit.

Advantageously, the chain limiter used is a dicarboxylic acid having Y carbon atoms, which is introduced in excess relative to stoichiometry of the diamine or diamines.

According to another embodiment (in the case of copolymers, i.e. copolyamides), the polyamide blocks result from the condensation of at least two different alpha-omega aminocarboxylic acids or of at least two different lactams having from 6 to 12 carbon atoms or of a lactam and an aminocarboxylic acid that does not have the same number of carbon atoms optionally in the presence of a chain limiter.

As examples of polyamide blocks of the third type, we may mention those formed by the following polyamides (copolyamides):

PA 6/6.6 in which 6 denotes caprolactam and 6.6 denotes a monomer resulting from the condensation of hexamethylenediamine with adipic acid.

PA 6.6/Pip.10/12 in which 6.6 denotes a monomer resulting from the condensation of hexamethylenediamine with adipic acid. Pip.10 denotes a monomer resulting from the condensation of piperazine with sebacic acid. 12 denotes lauryllactam.

PA 6.6/6.10/11/12 in which 6.6 denotes a monomer resulting from the condensation of hexamethylenediamine with adipic acid. 6.10 denotes a monomer resulting from the condensation of hexamethylenediamine with sebacic acid. 11 denotes amino-11-undecanoic acid. 12 denotes lauryllactam.

As examples, we may also mention PA 10.10/11, PA 6.10/11, PA 10.12/11, PA 10.10/11/12, PA 6.10/10.10/11, PA 6.10/6.12/11, PA 6.10/6.12/10.10.

The polyether blocks can represent 1 to 99 wt. %, and preferably 5 to 90 wt. % of the copolymer with polyamide and polyether blocks. The molar mass Mn of the polyether blocks is in the range from 100 to 6000 g/mol and preferably from 200 to 3000 g/mol, even more preferably from 250 to 2000 g/mol.

The preparation of the copolymers with polyamide block(s) and polyether block(s) according to the invention comprises any means for attaching the polyamide blocks (PA blocks) and polyether blocks (PE blocks) according to the present invention. In practice, essentially two processes are used: a two-stage process and a one-stage process.

In the one-stage process, the polyamide precursors, the chain limiter and the polyether are mixed together. Thus, polyamide blocks are also produced in the one-stage process. The simultaneous polycondensation of the polyether blocks and of the precursors of the polyamide blocks is preferably carried out at a temperature from 180 to 300° C. A polymer is then obtained having essentially polyether blocks, polyamide blocks of very variable length, but also the various reactants that have reacted randomly, which are distributed statistically (randomly) along the polymer chain.

Whether using a one-stage process or a two-stage process, it is advantageous to work in the presence of a catalyst. "Catalyst" means any product that can facilitate bonding of the polyamide blocks and of the polyether blocks by esterification or by amidation. The esterification catalyst is advantageously a derivative of a metal selected from the group comprising titanium, zirconium and hafnium or a strong acid such as phosphoric acid or boric acid. The catalysts described in the following patents can be used: U.S. Pat. No. 4,331,786, U.S. Pat. No. 4,115,475, U.S. Pat. No. 4,195,015, U.S. Pat. No. 4,839,441, U.S. Pat. No. 4,864,014, U.S. Pat. No. 4,230,838 and U.S. Pat. No. 4,332,920, WO 04 037898, EP 1262527, EP 1270211, EP 1136512, EP 1046675, EP 1057870, EP 1155065, EP 506495 and EP 504058.

In the two-stage process, the polyamide blocks are produced first, then in a second stage the polyamide blocks and polyether blocks are attached. The polyetherdiol blocks according to the invention are either used as they are and copolycondensed with polyamide blocks with carboxylic ends, or they are aminated, being converted to polyether diamines and condensed with polyamide blocks with carboxylic ends. The general method of two-stage preparation of PEBA copolymers having ester bonds between the PA blocks and the PE blocks is known and is described, for example, in French patent FR 2 846 332. The general method of preparation of the PEBA copolymers of the invention having amide bonds between the PA blocks and the PE blocks is known and is described for example in European patent EP 1 482 011.

The reaction of formation of the PA block is usually carried out between 180 and 300° C., preferably from 200 to 290° C., the pressure in the reactor is set between 5 and 30 bars, and it is maintained for about 2 to 3 hours. The pressure is reduced slowly, exposing the reactor to atmospheric pressure, then the excess water is distilled, for example for an hour or two.

Once the polyamide with carboxylic acid ends has been prepared, the polyether and a catalyst are added. The polyether can be added in one go or gradually, similarly for the catalyst. According to an advantageous embodiment, first some or all of the polyether is added; reaction of the CH ends of the polyether and of the COOH ends of the polyamide begins with formation of ester bonds and elimination of water. As much of the water as possible is removed from the reaction mixture by distillation, then the catalyst is introduced for bonding the polyamide blocks and polyether blocks. This second stage is carried out with stirring, preferably under a vacuum of at most 100 mbar, preferably of at most 50 mbar, preferably of at most 20 mbar, preferably at most 10 mbar, at a temperature such that the reactants and the copolymers obtained are in the molten state. As an example, this temperature can be between 100 and 300° C. and is generally between 200 and 250° C. The reaction is monitored by measurement of the torque exerted by the molten polymer on the stirrer or by measurement of the electric power consumed by the stirrer. The end of the reaction is determined by the target value of the torque or power.

It will also be possible to add during the synthesis, at the moment judged to be the most suitable, one or more molecules used as antioxidant, for example Irganox® 1010 or Irganox® 245.

Advantageously, the PEBA copolymers comprise PA blocks comprising at least one of the following polyamides PA 11, PA 10.10, PA 10.12, PA 10.14, PA 10.18, PA 6.10, PA 6.12, PA 6.14, PA 6.18 as principal components (percentage by mass above 50% of the total mass of PA) and PE blocks comprising PTMG of renewable origin as principal component (percentage by mass above 50% of the total mass of PE), and optionally PO3G of renewable origin as other components of the PE blocks of the PEBA of the invention.

Particularly preferred block copolymers of the invention are PA11-PTMG, PA10.10-PTMG, PA10.12-PTMG, PA10.14-PTMG, PA6.10-PTMG, PA6.12-PTMG, and/or PA6.18-PTMG. In particular, PA11-PTMG according to the invention, of totally renewable origin, is preferred.

According to a second embodiment, the block copolymer of the present invention comprises at least one polyether flexible block which comprises at least one polytetramethylene glycol obtained at least in part from raw materials of renewable origin and at least one polyester block.

Polyester means, in the sense of the invention, the products of condensation of dicarboxylic acids with dials, and as a general rule, any polymer whose macromolecular backbone contains repeating units containing the ester chemical function.

The polyester blocks (abbreviated hereinafter as PES blocks) are usually made by polycondensation between a dicarboxylic acid and a diol. Suitable carboxylic acids comprise those mentioned above used to form the polyamide blocks. Suitable dials comprise linear aliphatic dials such as ethylene glycol, 1,3-propylene glycol, 1,4-butylene glycol, 1,6-hexylene glycol, branched diols such as neopentylglycol, 3-methylpentane glycol, 1,2-propylene glycol, and cyclic dials such as 1,4-bis(hydroxymethyl)cyclohexane and 1,4-cyclohexane-dimethanol.

Advantageously, the block copolymer of the present invention forms a copolyetherester (abbreviation COPE), i.e. a copolymer with polyester and polyether blocks.

The COPEs according to the invention therefore include any TPE comprising at least one polyether block (PE) derived at least partly from THF comprising $^{14}C$, preferably comprising polytetramethylene glycol (or PTMG) derived at least partially from renewable materials, and at least one polyester block PES (homopolymer or copolyester) derived from fossil materials or else derived totally or partially (in the case of mixed polyesters) from renewable raw materials.

The COPEs comprise polyether flexible blocks derived from polyetherdiols and polyester rigid blocks, which result from reaction of at least one dicarboxylic acid with at least one chain-extending short diol unit. The polyester blocks and polyether blocks are joined by ester bonds resulting from the reaction of the acid functions of the dicarboxylic acid with the OH functions of the polyetherdiol. The chain of polyethers and diacids forms the flexible blocks, whereas the chain of glycol or of butanediol with the diacids forms the rigid blocks of the copolyetherester. The chain-extending short diol can be selected from the group comprising neopentylglycol, cyclohexanedimethanol and aliphatic glycols of formula $HO(CH_2)_nOH$, in which n is an integer from 2 to 10.

Advantageously, the diacids are aromatic dicarboxylic acids having from 8 to 14 carbon atoms. Up to 50 mol. % of the aromatic dicarboxylic acid can be replaced with at least one other aromatic dicarboxylic acid having from 8 to 14 carbon atoms, and/or up to 20 mol. % can be replaced with an aliphatic dicarboxylic acid having from 2 to 14 carbon atoms.

As examples of aromatic dicarboxylic acids, we may mention terephthalic acid, isophthalic acid, dibenzoic acid, naphthalene dicarboxylic acid, 4,4'-diphenylenedicarboxylic acid, bis(p-carboxyphenyl)methane acid, ethylene-bis-p-benzoic acid, 1,4-tetramethylene-bis(p-oxybenzoic) acid, ethylene-bis-(p-oxybenzoic) acid, 1,3-trimethylene-bis-(p-oxybenzoic) acid.

As examples of glycols, we may mention ethylene glycol, 1,3-trimethylene glycol, 1,4-tetramethylene glycol, 1,6-hexamethylene glycol, 1,3-propylene glycol, 1,8-octamethylene glycol, 1,10-decamethylene glycol and 1,4-cyclohexylene dimethanol.

The copolymers with polyester and polyether blocks are copolymers having polyether units derived from polyetherdiols as defined previously, for example polyethylene glycol (PEG), polypropylene glycol (PPG), polytrimethylene glycol (PO3G) or polytetramethylene glycol (PTMG), dicarboxylic acid units such as terephthalic acid and glycol units (ethanediol) or 1,4-butanediol. Said copolyetheresters are described in patents EP402883 and EP405227. These polyetheresters can also contain plasticizers and other additives that are well known by a person skilled in the art.

According to a third embodiment, the block copolymer of the present invention comprises at least one polyether flexible block derived at least partially from THF containing $^{14}C$, preferably comprising at least one polytetramethylene glycol obtained at least in part from raw materials of renewable origin, and at least one polyurethane rigid block.

Polyurethane (abbreviation PU) means, in the sense of the invention, the products resulting from the reaction of at least one diisocyanate which can be selected from the aromatic diisocyanates (e.g. MDI, TDI) and/or the aliphatic diisocyanates (e.g. HDI or hexamethylenediisocyanate) with at least one short diol. This chain-extending short diol can be selected from the glycols mentioned above in the description of the copolyetheresters. The polyurethanes included in the composition of the copolymers according to the invention can comprise all types of polyols, and in particular those of renewable origin, such as polyols derived from starch (erythritol, sorbitol, maltitol, mannitol), polyols derived from sugars such as sucrose (isomalt, xylitol), polyols derived from maize, soya, cotton, colza, sunflower or peanut (glycerol, propylene glycol, ethylene glycol, coproduct of the reaction for production of biodiesel). As other examples of polyols that can be included in the composition of these polyurethanes, we may also mention polyethylene glycol (PEG), poly(1,2-propylene glycol) (PPG), poly(1,3-propylene glycol) (PO3G), polytetramethylene glycol (PTMG), whether they are of petrochemical origin or renewable origin. Advantageously, PTMG obtained from THF containing $^{14}C$, in particular PTMG obtained from furfural, will be used.

Advantageously, the block copolymer of the present invention forms a thermoplastic polyurethane (abbreviation TPU), i.e. a copolymer with polyurethane and polyether blocks, also called polyetherurethane.

The TPUs according to the invention therefore include any TPE comprising polyether blocks, the latter being derived at least in part from THF comprising $^{14}C$, including for example polytetramethylene glycol or PTMG derived at least partially from renewable materials; and PU blocks (homopolymer or copolyurethane) derived from fossil materials or else obtained totally or partially (in the case of mixed polyurethanes) from renewable raw materials, and said PU blocks can also be obtained from THF comprising $^{14}C$, and comprise for example polytetramethylene glycol (PTMG) derived at least partially from renewable materials.

The polyetherurethanes result from the condensation of polyether flexible blocks, which are polyetherdiols, and of polyurethane rigid blocks. The polyurethane blocks and polyether blocks are joined together by bonds resulting from the reaction of the isocyanate functions of the polyurethane with the OH functions of the polyetherdiol.

If the block copolymers described above generally comprise at least one polyether flexible block and at least one rigid block, it is evident that the present invention in fact covers all the copolymers comprising two, three, four (or even more) different blocks selected from those described in the present description, if at least one of these blocks is derived from at least one tetrahydrofuran monomer containing $^{14}C$.

Advantageously, the copolymer according to the invention is a segmented block copolymer comprising three different types of blocks (called "triblock" in the present description of the invention), which result from the condensation of several of the blocks described above. Said triblock is preferably selected from copolyetheresteramides, copolyetheramideurethanes, copolyetheresterurethanes, in which:
the percentage by mass of polyether flexible block is above 20%;
the percentage by mass of polyamide rigid block is above 10%;
of the total mass of triblock.

The block copolymer of the invention can also be used alone or as a blend, said copolymer representing by mass from 5 to 100%, preferably from 5 to 70%, preferably from 5 to 30%, of the total mass of the blend.

The copolymer according to the invention can have as additives: stabilizers, plasticizers, lubricants, natural or organic fillers, dyes, pigments, nacres, antimicrobial agents, fireproofing agents, antistatic agents, agents modifying the viscosity of the copolymer, and/or any other additive well known by a person skilled in the art in the field of thermoplastic polymers.

The present invention also relates to a method for preparing a copolymer as defined above. The method according to the invention comprises the stage of supplying PE derived at least partially from THF comprising $^{14}C$, and conversion by synthesis to the block copolymer according to the invention.

Preferably, said PE comprises PTMG having a biocarbon content of at least 1%, and said conversion by synthesis leads to a block copolymer that comprises at least one PTMG block of at least partially renewable origin.

According to one embodiment, said stage of supplying PE in the method of the invention further comprises a preliminary stage of production of PE (preferably PTMG) from tetrahydrofuran (THF) having a biocarbon content of at least 1%.

This production of PE (PTMG here) comprises a stage of ring-opening polymerization of THF, catalyzed by fluorosulfonic acid, and a stage comprising hydrolysis and extractions with water in order to remove the ester sulfate groups bound to the polymer, the remaining acid and the water-soluble short polyether chains.

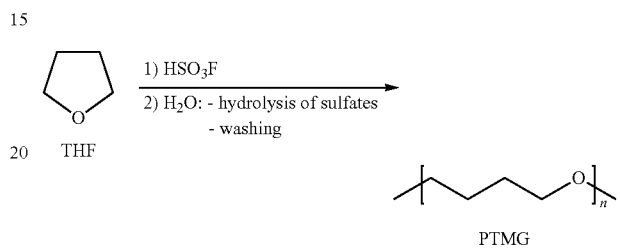

Alternatively, and more and more commonly, the THF ring can be opened by acid catalysis and then reacted with acetic anhydride to form diacetate of PTMG, which is then converted to polyether glycol via alcoholysis.

According to another embodiment, said stage of supplying PE, such as PTMG, from THF in the method of the invention further includes a preliminary stage of production of said tetrahydrofuran from furfural (2-furaldehyde). The production of THF from furfural involves catalytic decarbonylation to furan and hydrogenation of the furan obtained to THF, according to the following reactions:

Furfural

↓ catalysis furan

↓ $H_2$ + catalysis

THF

According to yet another embodiment, said stage of supplying PE (PTMG here) from furfural in the method of the invention also includes a preliminary stage of production of said furfural from plant biomass. The furfural is obtained from vegetable matter containing pentosans.

The raw material containing pentosans that is used can comprise various plant wastes, such as maize stalks and cobs, husks of oat, rice, and cotton or other residues of agricultural origin, or vegetable matter with a rigid structure, such as wooden logs, or sawmill wastes such as sawmill offcuts, chips, sawdust, wood flour.

Acid hydrolysis of the pentosans produces pentoses, which, by dehydration, give furfural, according to the following reactions:

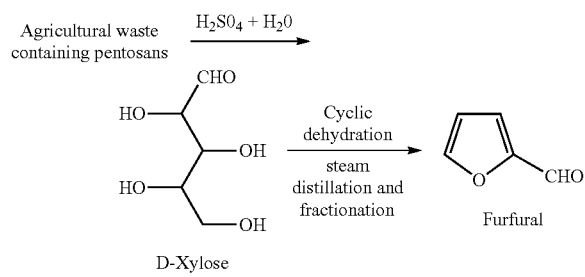

D-Xylose

The operating conditions as well as the variants of this process for making furfural are well known by a person skilled in the art, and are described for example in the patent documents U.S. Pat. No. 1,735,084, FR1181953, DE719704, DE740602, FR720424, GB922685, EP0033323 and in the document "Procédé Agrifurane" in "Techniques de l'ingénieur—Genie Chimique", Vol. 4, page J. 6020-1501.

The acid used as catalyst can be for example sulfuric acid at varying dilution, phosphoric acid, an alkane-sulfonic acid, hydrochloric acid.

Hydrolysis of the pentosans contained in the vegetable matter, in the presence of acid, yields a solution of pentoses. This solution of pentoses is dehydrated to obtain furfural, by the action of steam. According to the invention, the furfural obtained is submitted to a suitable purification process, to obtain pure furfural.

The method according to the invention makes it possible to obtain a block copolymer from THF of renewable origin, and with performance that is identical (or even better) than that of the corresponding copolymers (same chemical formula) but of fossil origin.

Finally, the method of manufacture of block copolymers of the invention makes it possible to reduce, or even completely eliminate the consumption of raw materials of petroleum origin, and use raw materials obtained from the growing of plants. Furthermore, it makes it possible to reduce emissions of greenhouse gases.

The invention claimed is:

1. A block copolymer derived from at least one tetrahydrofuran monomer containing $^{14}C$, wherein said block copolymer has a content of biocarbon of at least 1% by weight of, which corresponds to a $^{14}C/^{12}C$ isotope ratio of at least $1.2\times 10^{-14}$.

2. The copolymer as claimed in claim 1, comprising at least one polyether block derived at least partially from tetrahydrofuran containing at least 1% by weight of $^{14}C$.

3. The copolymer as claimed in claim 1, wherein said copolymer is a triblock comprising three different blocks, said triblock being selected from copolyetheresteramides, copolyetheramideurethanes, copolyetheresterurethanes, wherein:
   the percentage by mass of polyether flexible block is above 20%;
   the percentage by mass of polyamide rigid block is above 10%;
of the total mass of triblock.

4. The block copolymer as claimed in claim 1, comprising:
   from 1 to 99% of at least one polyether flexible block derived at least partially from tetrahydrofuran containing at least 1% by weight $^{14}C$, and
   from 1 to 99% of at least one rigid block selected from: polyamide blocks, polyurethane blocks, polyester blocks, and mixtures thereof.

5. The block copolymer as claimed in claim 4, wherein said at least one polyether flexible block comprises at least one polytetramethylene glycol (PTMG) derived at least partially from renewable materials.

6. The copolymer as claimed in claim 5 wherein said at least one polyether block additionally comprises polyethers other than PTMG, selected from the group consisting of PEG, PPG, PO3G, and poly(3-methyltetrahydrofuran) of renewable origin or of fossil origin.

7. The copolymer as claimed in claim 4, wherein:
   the proportion by mass of said at least one flexible block represents from 5 to 95%,
   the proportion by mass of said at least one rigid block represents from 5 to 95%, of the total mass of the copolymer.

8. The copolymer as claimed in claim 4, wherein said at least one rigid block is derived at least partially from renewable raw materials.

9. The copolymer as claimed in claim 4, wherein said at least one polyether block and/or said at least one rigid block is/are derived totally from renewable materials.

10. The copolymer as claimed in claim 4 wherein said PEBA is based on PA11-PTMG.

11. The copolymer as claimed in claim 1, comprising a content of biocarbon above 5%.

12. The copolymer as claimed in claim 11, comprising a content of biocarbon above 50%.

13. The copolymer as claimed in claim 12, comprising a content of biocarbon above 98%.

14. The copolymer as claimed in claim 13, comprising a content of biocarbon of about 100%.

15. The copolymer as claimed in claim 1, wherein said copolymer comprises at least one polyamide block.

16. The copolymer as claimed in claim 15, wherein the polyamide comprises a copolymer.

17. The copolymer as claimed in claim 15, wherein said at least one polyamide block comprises at least one of the following molecules: amino-11-undecanoic acid, n-heptylamino-11-undecanoic acid, succinic acid, azelaic acid, sebacic acid, dodecanedioic acid, myristic acid, tetradecanedioic acid, hexadecanedioic acid, octadecanedioic acid, butanediamine, pentanediamine, decamethylenediamine, fatty diacid(s), fatty acid dimer(s) and mixtures thereof.

18. The copolymer as claimed in claim 15, wherein said at least one polyamide block comprises at least one monomer selected from the following polyamide monomers: 11, 5.4, 5.9, 5.10, 5.12, 5.13, 5.14, 5.16, 5.18, 5.36, 6.4, 6.9, 6.10, 6.12, 6.13, 6.14, 6.16, 6.18, 6.36, 10.4, 10.9, 10.10, 10.12, 10.13, 10.14, 10.16, 10.18, 10.36, 10.T, 12.4, 12.9, 12.10, 12.12, 12.13, 12.14, 12.16, 12.18, 12.36, 12.T and mixtures thereof.

19. The copolymer as claimed in claim 1, wherein said copolymer is a polyamide-block-polyether (PEBA).

20. The copolymer as claimed in claim 19, wherein said PEBA is based on PA11-PTMG, PA10.10-PTMG, PA10.12-PTMG, PA10.14-PTMG, PA6.10-PTMG, PA6.12-PTMG, and/or PA6.18-PTMG.

21. The copolymer as claimed in claim 1, wherein said copolymer comprises at least one polyester block.

22. The copolymer as claimed in claim 21, wherein the polyester comprises a copolymer.

23. The copolymer as claimed in claim 21, wherein said at least one polyester block comprises at least one of the following molecules: ethylene glycol, 1,3-propanediol, 1,4-butanediol, 1,10-decanediol, 2,5-furandicarboxylic acid, succinic acid, azelaic acid, sebacic acid, dodecanedioic acid, myristic acid, tetradecanedioic acid, hexadecanedioic acid, octadecanedioic acid, fatty diacid, and dimerized fatty acid.

24. The copolymer as claimed in claim 21, wherein said copolymer is a polyetherester.

25. The copolymer as claimed in claim 1, wherein said copolymer comprises at least one polyurethane block.

26. The copolymer as claimed in claim 25, wherein the polyurethane comprises a copolymer.

27. The copolymer as claimed in claim 25, wherein said at least one polyurethane block is manufactured from at least one polyol of renewable origin, selected from the following polyols: polyols derived from starch; erythritol; sorbitol; maltitol; mannitol; polyols derived from sugars, sucrose; isomalt; xylitol; polyols derived from maize, soya, cotton, colza, sunflower or peanut; glycerol; propylene glycol; ethylene glycol; coproducts of the reaction for production of biodiesel; polyethylene glycol (PEG), poly(1,2-propylene glycol) (PPG), poly(1,3-propylene glycol) (PO3G), and polytetramethylene glycol (PTMG).

28. The copolymer as claimed in claim 25, wherein said copolymer is a polyetherurethane.

29. A method for preparing the block copolymer as claimed in claim 1, comprising the stage of supplying polyether derived at least partially from tetrahydrofuran containing at least 1% by weight $^{14}C$ and conversion by synthesis to a block copolymer.

30. The method as claimed in claim 29, wherein said polyether comprises polytetramethylene glycol having a biocarbon content of at least 1%.

31. The method as claimed in claim 29, wherein the supply stage comprises a stage of production of polyether from tetrahydrofuran having a biocarbon content of at least 1%.

32. The method as claimed in claim 31, wherein the supply stage comprises a stage of production of said tetrahydrofuran from furfural.

33. The method as claimed in claim 32, wherein the supply stage comprises a stage of production of said furfural from plant biomass.

34. The method as claimed in claim 33, wherein said furfural is produced by hydrolysis of pentosans.

35. An article comprising the block copolymer as claimed in claim 1, wherein said article is selected from the group consisting of automobiles, textiles, woven fabrics, nonwovens, clothing, shoes, sports articles, leisure articles, electronics, computer equipment, health equipment, industrial additives, packaging and/or household products.

36. The article as claimed in claim 35, wherein the block copolymer is used in instrument panels, airbags, soles of sports shoes, golf balls, tubes for medical use, catheters, angioplasty balloons, peristaltic bands, conveyor belts, breathable rainwear, antistatic additives, skin panels, and/or synthetic leather.

37. The article as claimed in claim 35, wherein the block copolymer is used alone or mixed, said copolymer representing by mass from 5 to 100%.

* * * * *